US008521747B2

(12) United States Patent
Bose et al.

(10) Patent No.: US 8,521,747 B2
(45) Date of Patent: Aug. 27, 2013

(54) SYSTEM AND METHOD FOR SELECTIVELY CONSOLIDATING APPLICATIONS TO A MACHINE USING RESOURCE UTILIZATION DATA

(75) Inventors: Sumit Kumar Bose, Delhi (IN); Rashi Malviya, Allahabad (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/543,251

(22) Filed: Jul. 6, 2012

(65) Prior Publication Data

US 2013/0024455 A1 Jan. 24, 2013

(30) Foreign Application Priority Data

Jul. 19, 2011 (IN) ............................ 2451/CHE/2011

(51) Int. Cl.
*G06F 9/46* (2006.01)
*G06F 7/00* (2006.01)
*G06F 17/30* (2006.01)
*G06F 15/16* (2006.01)

(52) U.S. Cl.
USPC .......................................... 707/740; 718/105

(58) Field of Classification Search
USPC .......................................... 718/105; 707/740
See application file for complete search history.

(56) References Cited

U.S. PATENT DOCUMENTS

2008/0201711 A1* 8/2008 Amir Husain .................... 718/1
2010/0223364 A1* 9/2010 Wei ................................ 709/238

OTHER PUBLICATIONS

Ajiro, Yasuhiro et al., "A Combinatorial Optimization Algorithm for Server Consolidation", The 21st Annual Conference of the Japanese Society for Artificial Intelligence 2007.
Bose, Sumit et al., "A Mathematical Model for Enabling Physical Server Consolidation", Technical Report, Infosys Technologies Ltd., 2007.
Gupta, Rohit et al., "A Two Stage Heuristic Algorithm for Solving the Server Consolidation Problem with Item-Item and Bin-Item Incompatibility Constraints", IEEE SCC (2) 2008, pp. 39-46.
Zhang, Alex et al., "A High-Dimentional Bin-Packing Algorithm for Server Consolidation", http;//www2.twgrid.org/event/isge2006/Presentation%20Material/0504-Industry%20Track/Industry-Meichun-05042006.pdf.

* cited by examiner

*Primary Examiner* — Usmaan Saeed
*Assistant Examiner* — Brian E. Weinrich
(74) *Attorney, Agent, or Firm* — LeClairRyan, a Professional Corporation

(57) ABSTRACT

A system and method of selectively consolidating applications on a machine comprises retrieving resource utilization data for a plurality of applications over a plurality of cycles for designated resource dimensions. A representative utilization profile is calculated on each application for each resource dimension. Load mean and variance values of the applications are calculated for each resource dimension. Each application is assigned to a class based the mean and variance values. A consolidation algorithm is computed on each application for each resource dimension to determine if resource consumption of the consolidated applications potentially exceed an available capacity in a machine.

18 Claims, 10 Drawing Sheets

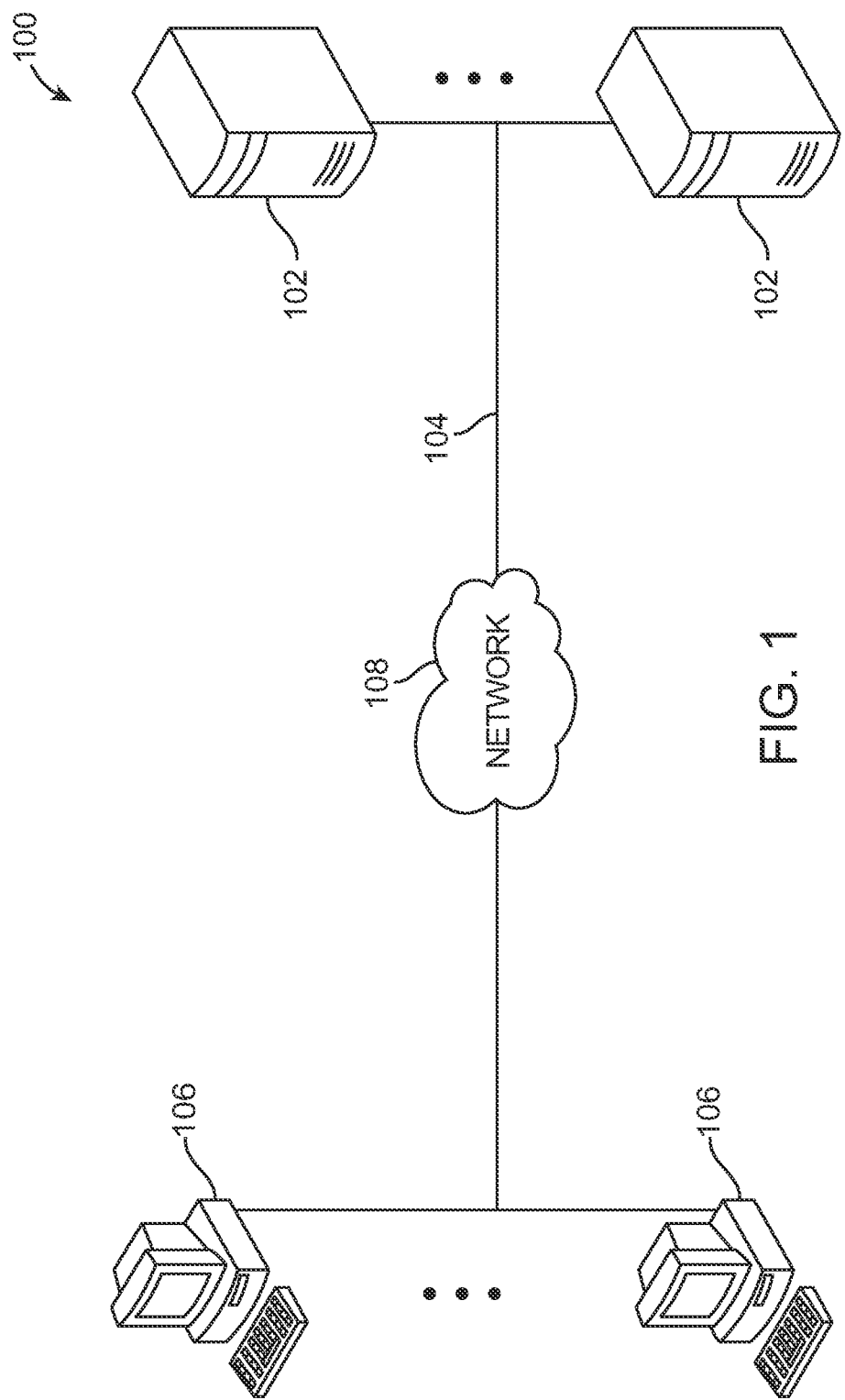

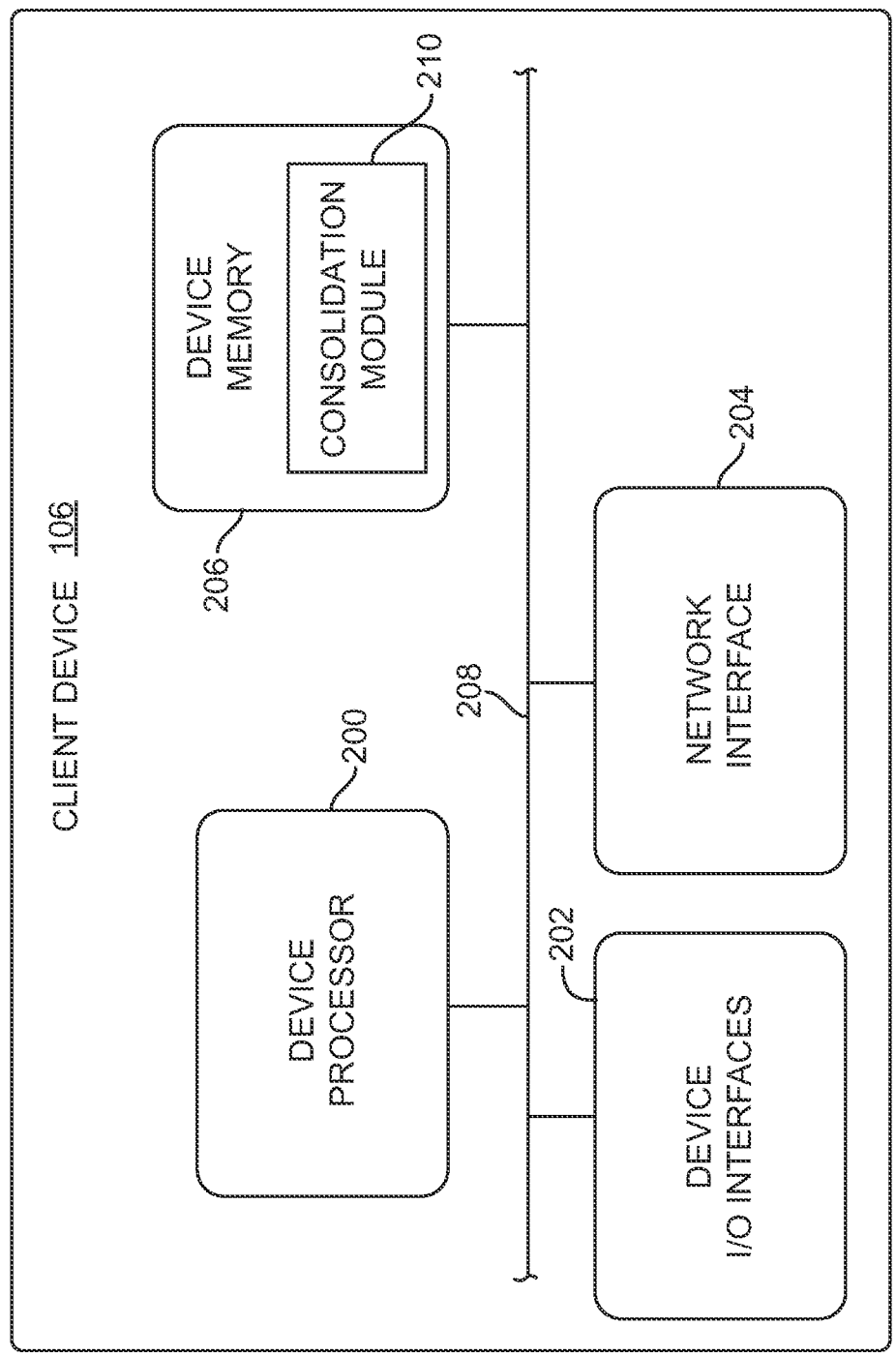

SYSTEM AND METHOD FOR SELECTIVELY CONSOLIDATING APPLICATIONS TO A MACHINE USING RESOURCE UTILIZATION DATA

This application claims the benefit of Indian Patent Application Filing No. 2451/CHE/2011, filed Jul. 19, 2011, which is hereby incorporated by reference in its entirety.

FIELD

The present disclosure relates to a system and method for selectively consolidating applications to a machine.

BACKGROUND

The process of server or machine consolidation is often done manually after analyzing the historical workload pattern of the servers running one or more applications. However, manually consolidating applications among servers is often a time consuming process and depends on the subjective assessment of the decision maker. As the number of servers increase, it becomes extremely difficult to deal with the consolidation process manually.

Consolidation of server applications can also be done using an automated process using algorithms that assume fixed values of server resource consumption throughout over set time periods. The algorithms proposed to overcome the limitations of the manual process are motivated by the solution schemes proposed for solving the vector packing and the bin-packing problems. These algorithms are not accurate as they assume that the applications consume a fixed amount of resources throughout its lifetime. However, in reality, the amount of resources used by the applications can vary greatly. In fact, the ratio of peak utilization and slump utilization may be as high as 11:1. In other words, taking into consideration the actual levels of resource utilization by an application is difficult since resource consumption varies across different time instances within a particular time period.

What is needed is a system and method which exploits the knowledge of the resource utilization patterns of different applications to arrive at a better consolidation of applications onto one or more machines.

SUMMARY

In an aspect, a method of selectively consolidating applications on a machine is described. The method comprises retrieving, from a database, resource utilization data for a plurality of applications running on one or more machines, wherein the resource utilization data gathered from the database is over a plurality of cycles in relation to one or more designated resource dimensions. The method comprises calculating, using a processor on a network device, a representative utilization profile for a first application for each of the one or more designated resource dimensions using a curve representation technique. The method comprises calculating, using the processor, a first load mean value and a first load variance value of the first application for each of the one or more resource dimensions and assigning the first application to a first class category based the first load mean value and the first load variance value. The method comprises selecting a second application assigned to the first class category to consolidate with the first application, wherein the second application has a first load mean value and a first load variance value based on a calculated representative utilization profile. The method comprises computing, using the processor, a consolidation algorithm on the first and second applications for a respective resource dimension of the one or more designated resource dimensions. The consolidation algorithm at least partially analyzes the first and second load mean values and the first and second variance values and to determine if resource consumption of the consolidated first and second applications would potentially exceed an available capacity in the one or more designated resource dimensions of a selected machine.

In an aspect, a non-transitory computer readable medium having stored thereon instructions for selectively consolidating applications on a machine, is described. The medium comprises computer executable code, when executed by at least one computer, causes the computer to retrieve, from a database, resource utilization data for a plurality of applications running on one or more machines, wherein the resource utilization data gathered from the database is over a plurality of cycles in relation to one or more designated resource dimensions. The code causes the computer to calculate a representative utilization profile for a first application for each of the one or more designated resource dimensions using a curve representation technique. The code causes the computer to calculate a first load mean value and a first load variance value of the first application for each of the one or more resource dimensions and assign the first application to a first class category based the first load mean value and the first load variance value. The code causes the computer to select a second application assigned to the first class category to consolidate with the first application. The second application has a first load mean value and a first load variance value based on a calculated representative utilization profile for the second application. The code causes the computer to compute a consolidation algorithm on the first and second applications for a respective resource dimension of the one or more designated resource dimension. The consolidation algorithm at least partially analyzes the first and second load mean values and the first and second variance values and to determine if resource consumption of the consolidated first and second applications would potentially exceed an available capacity in the one or more designated resource dimensions of a selected machine.

In an aspect, a network device is described which comprises a network interface that is configured to allow communications with at least one database, a memory; and a processor coupled to the memory and the network interface. The processor is operative to retrieve, from the at least one database, resource utilization data for a plurality of applications running on one or more machines, wherein the resource utilization data gathered from the database is over a plurality of cycles in relation to one or more designated resource dimensions. The processor is operative to calculate a representative utilization profile for a first application for each of the one or more designated resource dimensions using a curve representation technique. The processor is operative to calculate a first load mean value and a first load variance value of the first application for each of the one or more resource dimensions and assign the first application to a first class category based the first load mean value and the first load variance value. The processor is operative to select a second application assigned to the first class category to consolidate with the first application, wherein the second application has a first load mean value and a first load variance value based on a calculated representative utilization profile for the second application. The processor is operative to compute a consolidation algorithm on the first and second applications for a respective resource dimension of the one or more designated resource dimensions. The processor, executing the consolidation algorithm, at least partially analyzes the first and second load mean values and the first and second variance values and to determine if resource consumption of the consolidated first and second applications would potentially exceed an available capacity in the one or more designated resource dimensions of a selected machine.

In one or more of the above aspects, the consolidation algorithm is a first fit algorithm, a best fit algorithm, or a string matching algorithm. In one or more of the above aspects, a candidate list record is generated of one or more proposed applications to consolidate with the first application, wherein the second application is in the candidate list record. A third application in the same category with the first and second applications is selected and load mean values of the first and third applications and load variance values of the first and third applications are combined. The third application is added to the candidate list record if the combination of the load mean values is less than a capacity of the machine and the combination of load variance values of the first and third applications is less than the load variance value of the first application and the combination of load variance values of the first and third applications is less than the load variance value of the third application.

In one or more of the above aspects, the consolidation algorithm is iteratively computed on the first and second applications for all remaining one or more designated resource dimensions. The first and second load mean values and the first and second variance values are at least partially analyzed using the consolidation algorithm to determine if resource consumption of the consolidated first and second applications would potentially exceed the available capacity in the remaining one or more designated resource dimensions of the selected machine. Consolidation of the first and second applications is proposed if the consolidation algorithm indicates that the resource consumption of the consolidated first and second applications would not exceed available capacities of the remaining one or more designated resource dimensions of the selected machine.

BRIEF DESCRIPTION OF THE DRAWINGS

FIG. 1 illustrates a diagram of an example system environment that utilizes a server consolidation process in accordance with an aspect of the present disclosure;

FIG. 2A illustrates a block diagram of a client device implementing at least a portion of a consolidation module in accordance with an aspect of the present disclosure;

DETAILED DESCRIPTION

Figure 2B:
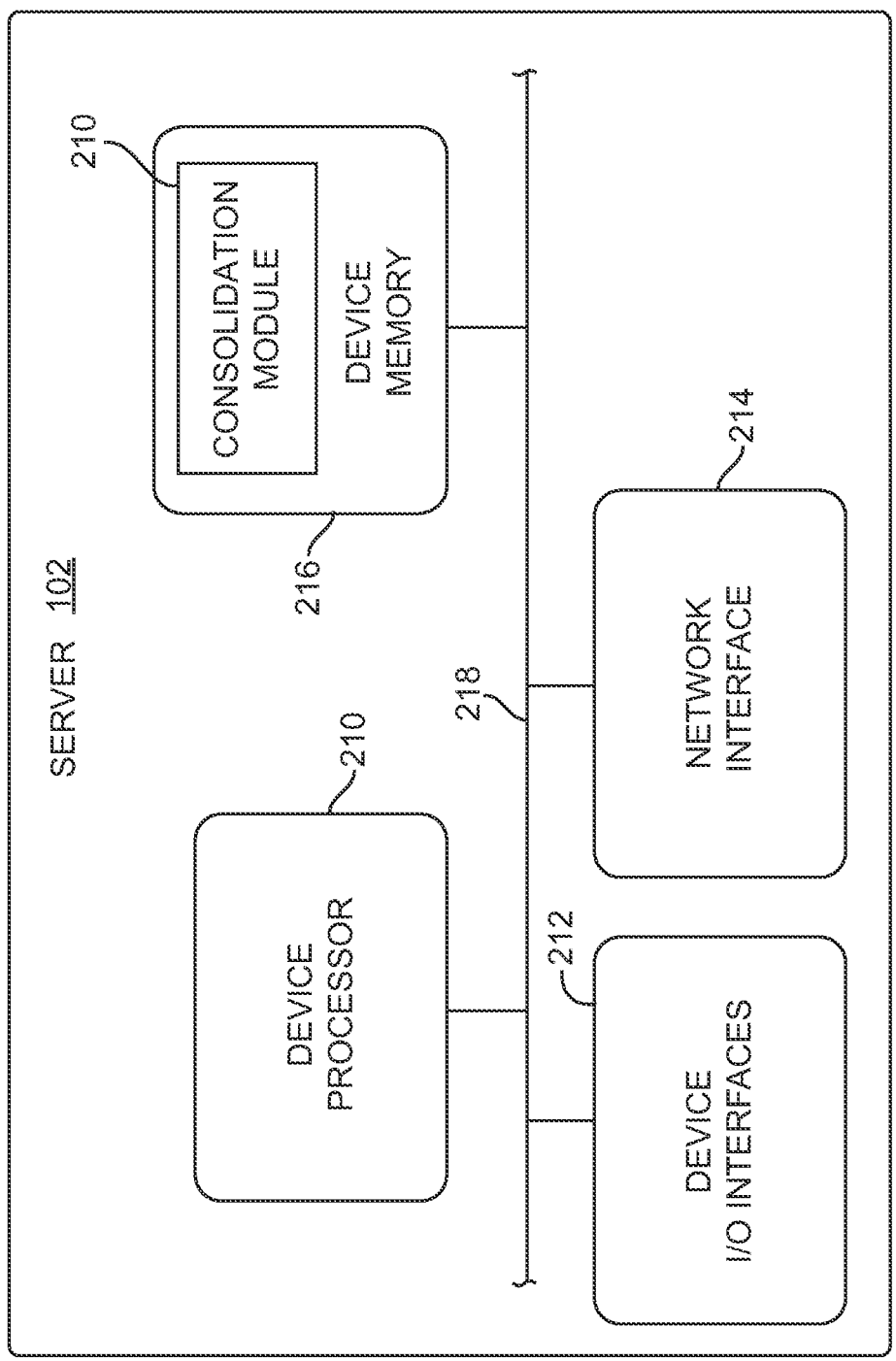
FIG. 2B illustrate a block diagram of a server implementing at least a portion of a consolidation module in accordance with an aspect of the present disclosure.

FIG. 1 illustrates a diagram of an example system environment that implements and executes a novel consolidation process and method of use in accordance with an aspect of the present disclosure. In particular, the example system environment 100 includes a plurality of network devices such as one or more servers 102(1)-102(n) and one or more client devices 106(1)-106(n), although the environment 100 could include other numbers and types of devices in other arrangements. It should be noted that the term "network devices" can be referred to as encompassing one or more client devices, one or more servers, virtual machines and/or other components in the system 100.

The servers 102(1)-102(n) are connected to a local area network (LAN) 104 and the client devices 106(1)-106(n) are connected to a wide area network 108, whereby the one or more client devices 106(1)-106(n) communicate with the one or more servers 102(1)-102(n) via the wide area network 108 and LAN 104. It should be noted that although the client device and/or server may be referred to herein in the plural, it is contemplated that only one client device and/or one server may be considered without being limiting to the language used herein. It should be understood that the particular configuration of the system 100 shown in FIG. 1 are provided for exemplary purposes only and is thus not limiting.

Client devices 106(1)-106(n) comprise computing devices capable of connecting to other computing devices, such as the servers 102(1)-102(n). Such connections are performed over wired and/or wireless networks, such as network 108, to send and receive data, such as for Web-based and non Web-based requests, receiving responses to requests and/or performing other tasks, in accordance with the novel processes described herein. Non-limiting and non-exhausting examples of such client devices 106(1)-106(n) include, but are not limited to, personal computers (e.g., desktops, laptops), mobile and/or smart phones, kiosks, ATMs, tablet devices, PDAs and the like.

In an example, client devices 106(1)-106(n) may be configured to run a Web browser or other software module that provides a user interface for human users to interact with, request resources and/or information, as well as submit instructions over the network 108 to the one or more servers 102(1)-102(n) via Web-based or non Web-based applications. One or more Web-based or non Web-based applications may accordingly run on the servers 102(1)-102(n) that provide the requested data to the client device 106(1)-106(n) and/or perform the requested instructions on behalf of the user. In an example, the client device 106 may be a smart phone, tablet, or smart television in which the client devices 106(1)-106(n) communicate with the servers 102(1)-102(n) via a mobile application (i.e. "mobile app").

Network 108 comprises a publicly accessible network, such as the Internet, which handles communication between the client devices 106(1)-106(n) and the servers 102(1)-102 (n). However, it is contemplated that the network 108 may comprise other types of private and public networks. Communications, such as requests from client devices 106(1)-106 (n) and responses from servers 102(1)-102(n), preferably take place over the network 108 according to standard network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts.

LAN 104 may comprise one or more private and public networks which provide secured access to the servers 102(1)-102(n). These types of existing standardized messaging schemes used between financial institutions over WANs and LANs is well known and is not described in detail herein.

The servers 102(1)-102(n) comprise one or more network devices or machines capable of operating one or more Web-based and/or non Web-based applications that may be accessed by other network devices (e.g. client devices, other servers) in the network 108. Such data includes, but is not limited to Web page(s), image(s) of physical objects, user account information, and any other objects and information. It should be noted that the servers 102(1)-102(n) may perform other tasks and provide other types of resources.

As will be discussed in more detail below, one or more servers 102 may comprise a cluster of a plurality of servers which are managed by a network traffic management device (e.g. firewall, load balancer, web accelerator), gateway device, router, hub and the like. In an aspect, one or more servers 102(1)-102(n) may implement a version of Microsoft® IIS servers, RADIUS servers and/or Apache® servers, although other types of servers may be used and other types of applications may be available on the servers 102(1)-102(n).

FIG. 2A illustrates a block diagram of a network client device 106 shown in FIG. 1 in accordance with an aspect of the present disclosure. As shown in FIG. 2A, an example client device 106 includes one or more device processors 200, one or more device I/O interfaces 202, one or more network interfaces 204 and one or more device memories 206, all of which are coupled together by one or more buses 208. It should be noted that the device 106 could include other types and numbers of components.

FIG. 2B illustrates a block diagram of a network device server 102 shown in FIG. 1 in accordance with an aspect of the present disclosure. With regard to FIG. 2B, an example server 102 is shown which includes one or more device processors 210, one or more device I/O interfaces 212, one or more network interfaces 214 and one or more device memories 216, all of which are coupled together by one or more buses 218. It should be noted that the server 102 could include other types and numbers of components.

Device processor 200, 210 comprises one or more microprocessors configured to execute computer/machine readable and executable instructions stored in the respective local device memory 206, 216 or in a remote device memory (not shown). Such instructions are implemented by the processor 200, 210 to perform one or more functions described below. It is understood that the processor 200, 210 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200, 210 is programmed or configured to execute the process in accordance with the teachings as described and illustrated herein of the novel system and method described below.

Device I/O interfaces 202, 212 comprise one or more user input and output device interface mechanisms. The interface may include a computer keyboard, touchpad, touchscreen, mouse, display device, and the corresponding physical ports and underlying supporting hardware and software to enable communications with other network devices in the system 100. Such communications include, but are not limited to, accepting user data input and providing output information to a user, programming, accessing one or more memory devices and administering one or more functions to be executed by the corresponding device and the like.

Network interface 204, 214 comprises one or more mechanisms that enable the client devices 106 and/or the servers 102 to engage in TCP/IP or other communications over the LAN 104 and network 108. However, it is contemplated that the network interface 204, 214 may be constructed for use with other communication protocols and types of networks. Network interface 204, 214 is sometimes referred to as a transceiver, transceiving device, or network interface card (NIC), which transmits and receives network data packets over one or more networks, such as LAN 104 and network 108.

In an example where the client device 106 and/or server 102 includes more than one device processor 200, 210 (or a processor 200, 210 has more than one core), each processor 200, 210 (and/or core) may use the same single network interface 204, 214 or a plurality of network interfaces 204, 214 to communicate with other network devices. Further, the network interface 204, 214 may include one or more physical ports, such as Ethernet ports, to couple its respective device with other network devices in the system 100. Moreover, the network interface 204, 214 may include certain physical ports dedicated to receiving and/or transmitting certain types of network data, such as device management related data for configuring the respective device, and the like.

Bus 208, 218 may comprise one or more internal device component communication buses, links, bridges and supporting components, such as bus controllers and/or arbiters. The bus enable the various components of the device 102, 106, such as the processor 200, 210, device I/O interfaces 202, 212, network interface 204, 214, and device memory 206, 216, to communicate with one another. However, it is contemplated that the bus may enable one or more components of its respective device 102, 106 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the device 102, 106 which houses the bus.

Device memory 206, 216 of the client device 106 or server 102 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 200, 210. Such stored instructions allow the processor to perform actions, including implementing an operating system for controlling the general operation of the client device 106 and/or server 102 to perform one or more portions of the novel process described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the network devices 102, 106.

Shown in FIGS. 2A and 2B is a consolidation module 210 is which comprises software, which when executed by one or more processors, causes the network device 102, 106 to perform the consolidation process described below and in FIGS. 4-7. It should be noted that although the consolidation module is shown within memory 206, 216, it may be housed in a separate memory within or exterior to the network device 102, 106.

The consolidation module 210 is configured to consolidate multiple applications running on different machines (e.g. servers, client devices, virtual machines) by taking into account the actual resource utilization profiles of the running applications rather than a fixed consumption value. Such applications may be one or more Web services, application services, virtualization services, network traffic management services, load balancing services, firewall services, encryption services or any other software that runs on the network device 102, 106.

As will be discussed in more detail below, the consolidation module 210 utilizes different statistical and non-statistical algorithms which take into account for the varying consumption levels of various applications running on their respective machines over different time instances. In performing the consolidation process, the module 210 takes into account the information provided by these algorithms to decide on which machine each application should be moved to in obtaining the best use of the available resources among the available machines. The process performed by the consolidation module 210 can also minimize the number of virtual machine migrations that are used to wrap up the running applications.

Figure 3:
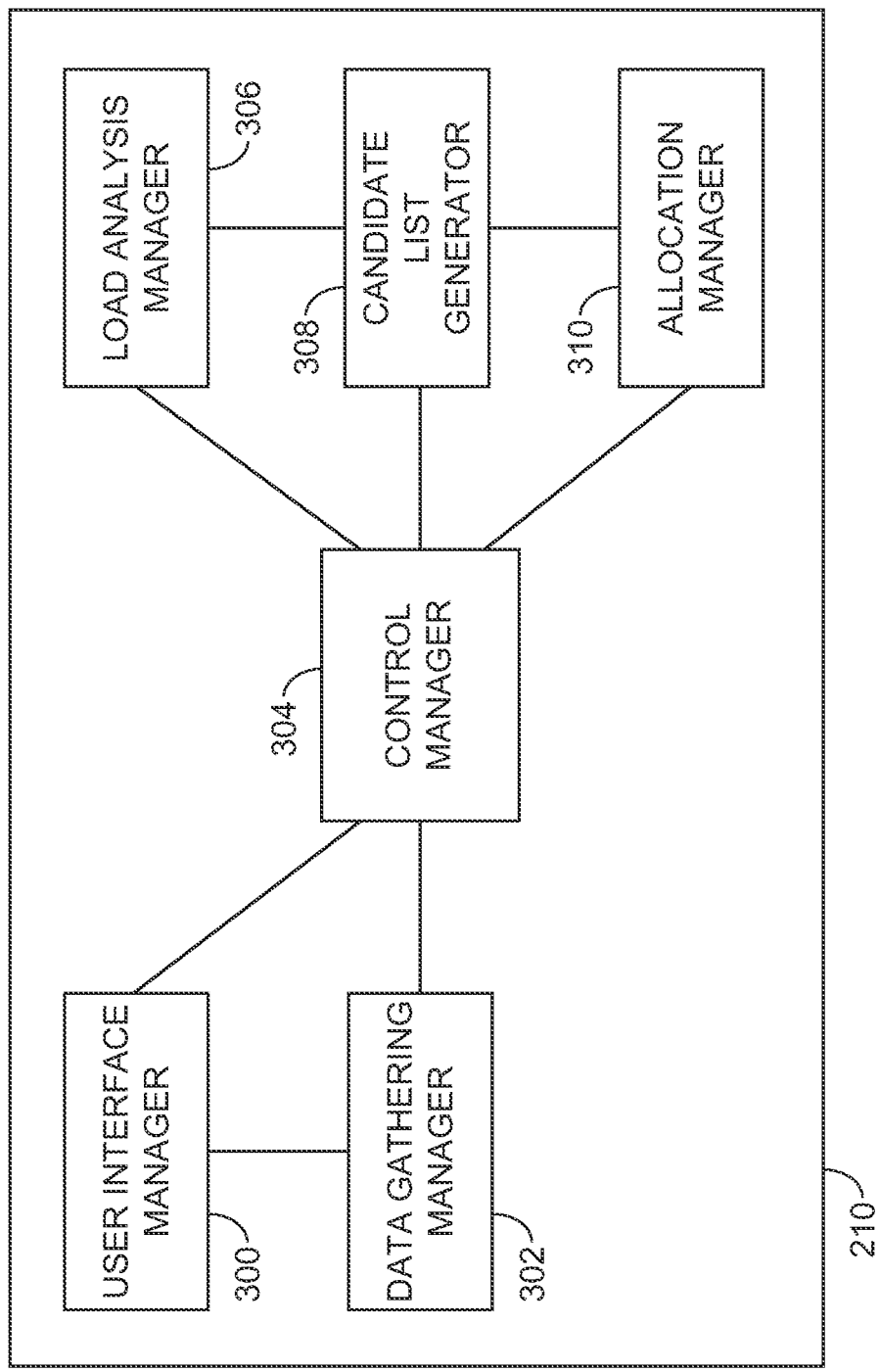
FIG. 3 illustrates an example block diagram of the consolidation module in accordance with an aspect of the present disclosure.

FIG. 3 illustrates a block diagram of the consolidation module 210 in accordance with an aspect of the present disclosure. In particular, the server consolidation module 210 utilizes a user interface manager 300, a data gathering manager 302, a control manager 304, a load analysis manager 306, a candidate list generator 308 and an allocation manager 310. Each of the components are coupled to the control manager 304, whereby the control manager 304 controls the processes run by the various other components and interfaces with the processor of the network device 106, 116. It is contemplated that the components of the consolidation manager 210 are examples only and the consolidation manager 210 may include additional or other components. Each of these components will be discussed in more detail below.

Figure 4:
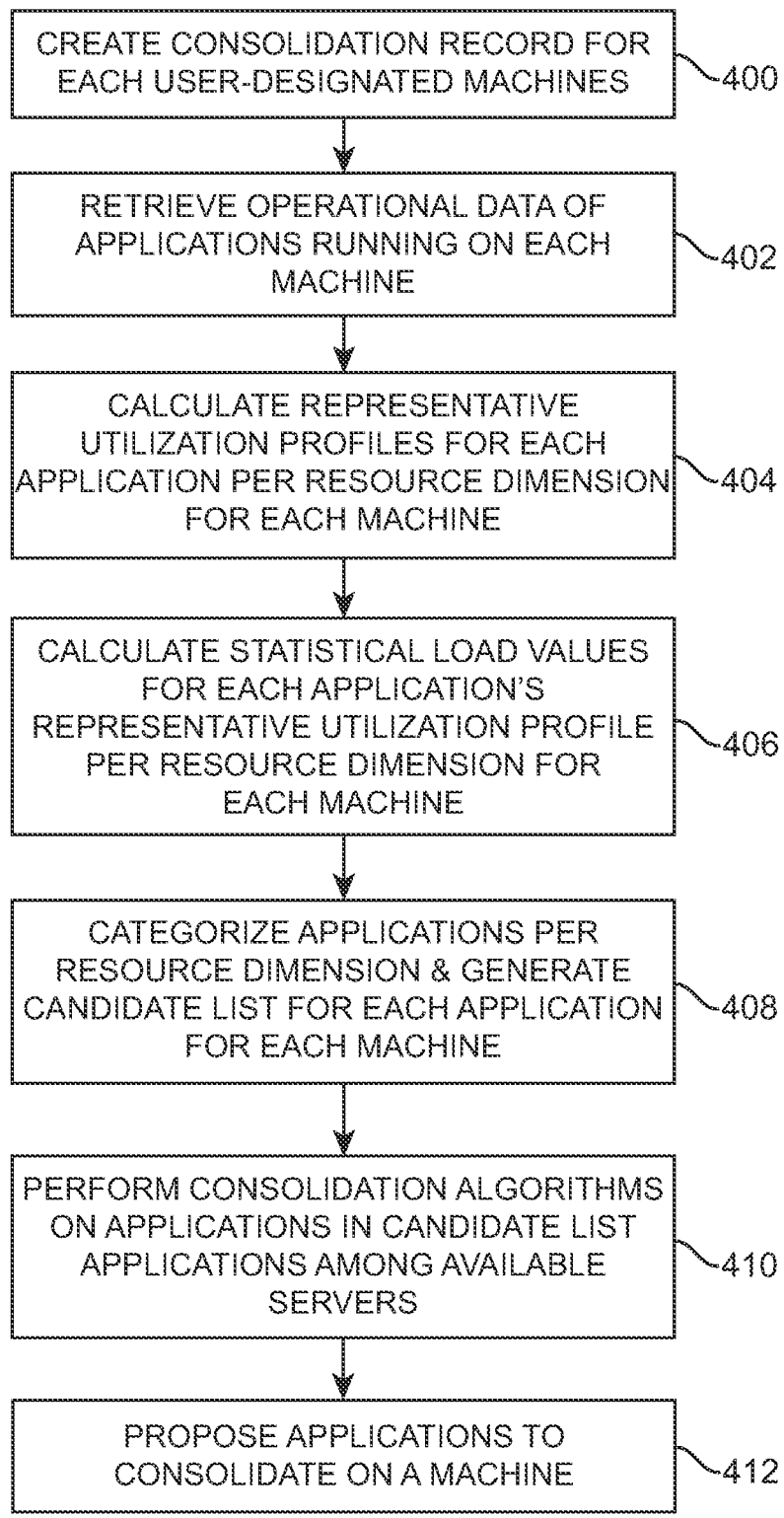
FIGS. 4-7 are example flow chart diagrams depicting portions of processes performed by at least the consolidation module in accordance with the present disclosure.

FIG. 4 illustrates a general overview of the consolidation process in accordance with an aspect of the present disclosure. As shown in FIG. 4, the process begins with the consolidation module 210 creating a consolidation record for each machine designated by the user in which the applications are to be analyzed for consolidation (Block 400). The user inputs such information into the consolidation module 210 via a user interface.

The user interface manager 300 provides a user interface that is displayed through which one or more users conducting the consolidation process are able to enter information as well as review the results of the consolidation process. In an aspect, the user is able to identify, via the user interface, the machines M, the applications app, the resource dimensions $R_d$ which are to be considered for the consolidation process.

As shown in FIG. 4, the process continues in which the consolidation module 210 retrieves operational data of the applications running on each identified machine (Block 402). In particular, the data gathering manager 302 is configured to collect resource utilization data for each application that is running on the user designated machines M as well as the capacity data of the available machines M along with any other relevant data that is needed to perform the consolidation process. The resource utilization data for each application is collected over a user designated number N cycles or epochs. The number of cycles can vary based on the particulars of the analysis and the desires of the user. The data gathering manager 302 collects resource utilization data for one or more resource dimensions $R_d$ that are consumed by the applications. These resources include, but are not limited to, server CPU processor consumption, port use, network interface load, and memory consumption and the like.

In other words, the collected resource utilization data includes the amount of an available machine resource that is consumed by the application for a resource dimension over the set period of time. In an aspect, the user designates, via the user interface, the amount of time over which utilization data should be collected. It is preferred that the amount of time over which utilization data is collected is the same for each cycle, although this is not required.

Figure 10:
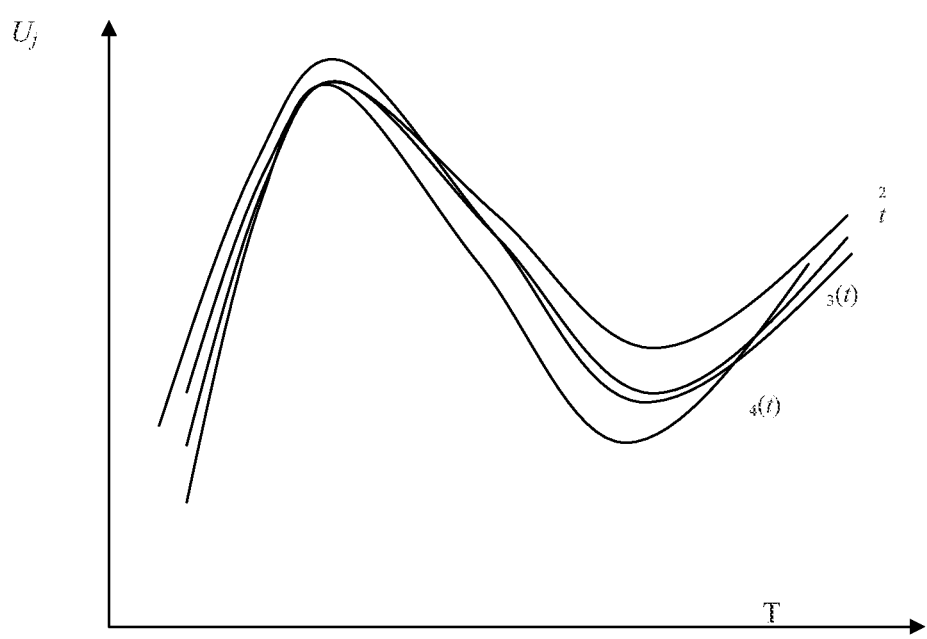

FIG. 10 illustrates a utilization profile of an application's consumption of a machine's resource over N cycles that is collected by the data gathering manager 302. In particular, $U_i$, represents the amount of a machine resource that was consumed or utilized by the application $app_i$ over a period of time for N cycles. In the present example, as shown in FIG. 10, four (4) cycles were designated by the user, thereby resulting in four (4) shown utilization curves.

As shown in FIG. 10, the utilization curve for each N cycle differs slightly from one another. The load analysis manager 306 of the consolidation module 210 therefore performs a curve registration technique on the N number of utilization curves (for N cycles) and calculates a representative utilization curve for that particular application for that designated resource definition (Block 404 of FIG. 4). In other words, for each user designated machine, the load analysis manager 306 performs the curve representation technique on each utilization profile for a designated resource dimension.

In aspect, the load analysis manager 306 can perform one or more available curve registration techniques including, but not limited to, landmark registration techniques, continuous monotone registration techniques, non-parametric goodness-to-fit techniques, local regression techniques and the like. In particular, the load analysis manager 306, upon performing the curve registration technique, is able to generate one representative utilization profile of the application's consumption of a designated resource dimension over the N cycles. For the example in FIG. 10, the load analysis manager 306 is able to use the curve registration technique to generate one utilization profile that is representative of $app_1$'s four utilization profiles over 12 months $T_1$ of machine's $M_1$ CPU resource dimension $R_1$.

In addition, the load analysis manager 306 performs a statistical analysis on the application's representative utilization profile to calculate load values for that application's utilization for each resource dimension (Block 406). In particular, the load values comprise a load mean value $\mu$ as well as a standard deviation or load variance value $\sigma$. In particular, the mean value $\mu$ represents the average or expected value of the application's consumption of the resource over time T for N cycles. Additionally, the standard deviation value $\sigma$ represents the amount of variance or dispersion there is from the mean. As will be addressed below, a low standard deviation value indicates that the data points tend of the representative utilization profile are closer to the mean value, whereas a high standard deviation value indicates that the data are spread out over a large range from the mean value.

The consolidation module 210 utilizes the calculated statistical load values of all the applications to categorize the applications resource dimension and generate candidate lists for applications to consolidate (Block 408). Once a candidate list is generated for each reference application for each resource dimension and designated machine, the consolidation module 210 performs one or more consolidation algorithms with regard to the applications in the candidate list (Block 410). The consolidation module 210 is then able to provide a set of proposed packed applications that can be consolidated onto the machine (Block 412).

Figure 5:
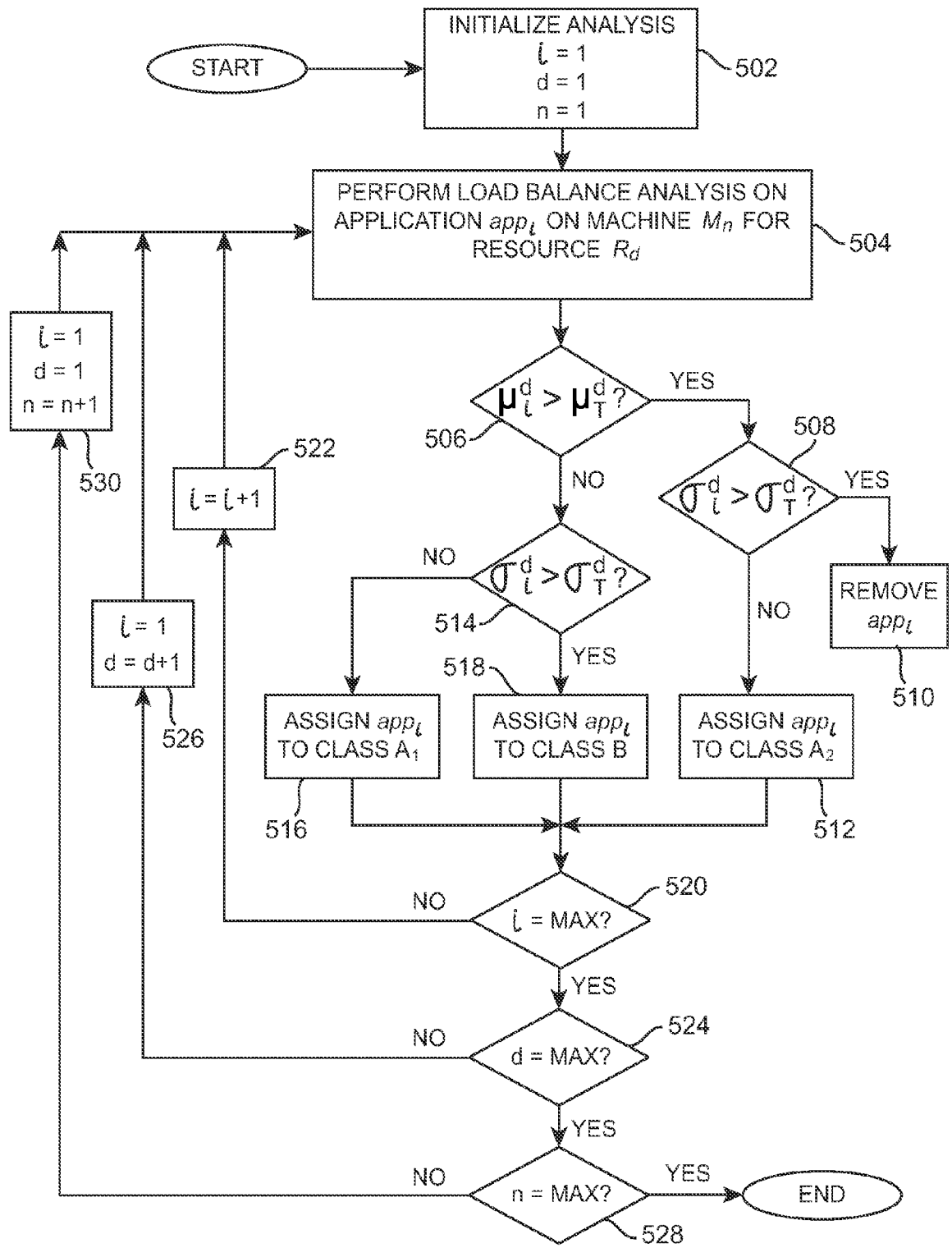

FIG. 5 illustrates a flow chart of associated with the calculation of statistical load values for each application in accordance with an aspect of the present disclosure. As shown in FIG. 5, the process begins where the value i for the application $app_i$ is initialized to 1; the value d for the resource dimension $R_d$ is initialized to 1; and the value for n for machine $M_n$ is set to 1 (Block 502). In an aspect, the user identifies the applications, resource dimensions, and machines that are to be considered in the consolidation process, whereby the consolidation module 210 assigns a number for each application, resource dimension and machine up to a maximum number. For example, if 12 machines, 30 applications and 3 resource dimensions are defined, the max value for i would be 30; the max value for d would be 3; and the max value for n would be 12.

In performing the process in FIG. 5, the load analysis manager 306 utilizes the mean and the standard deviation values to categorize the application for packing by the packing module, as discussed below. In particular, the mean value of the application identifies whether the application consumes a large amount or a small amount of the machine's resources. Additionally, considering that the utilization profile takes into account several cycles, the consumption data can vary widely. Accordingly, the standard deviation value provides an indicator as to how close to the mean value the utilization data actually is.

In an aspect, the load analysis manager 306 performs a pre-consolidation phase in which all of the analyzed applications are categorized into a Class based on each application's respective mean and standard deviation values. In an aspect, each Class has a specified threshold mean value and a specified threshold standard deviation value which dictate which Class each application will be assigned to. The threshold mean value $\mu$ used to determine whether a particular application has a high mean value $\mu_H$ or a low mean value $\mu_L$ can be set to any desired value depending on the user's preferences. Additionally, the threshold values for the standard deviation $\sigma$ that are set to determine whether a particular application has a high standard deviation value $\sigma_H$ or low high standard deviation value $\sigma_L$ can be set to any desired value depending on the user's preference.

In an example aspect, the consolidation module 210 generates three Classes having the following threshold characteristics: 1.) Class for a high mean value/low standard deviation value applications (e.g. Class $A_1$); 2.) Class for low mean value/low standard deviation value applications (e.g. Class $A_2$); and 3.) Class for low mean value/high standard deviation value applications (e.g. Class B). The number of Classes generated and utilized by the consolidation module 210 can be automatically determined or designated by the user via the user interface 300. Additionally, the number of Classes generated can be other values and are not limited to three. Further, each Class can be assigned other threshold characteristics and is not limited to the above characteristics.

In an example, the threshold values of the mean $\mu$ and standard deviation $\sigma$ are set to 50% and 0.3, respectively. It should be noted, however, that other threshold values can be designated by the user and are thus not limited to 50% and 0.3. In the present example, for an application that has a utilization mean value above 50%, the server consolidation module 210 will consider it consuming a relatively higher amount of the resource dimension $R_d$. In contrast, if the application has a utilization mean value below 50%, the consolidation module 210 will consider it as consuming a lesser relative amount of the resource dimension $R_d$. It is quite likely that a particular application may belong to Class $A_1$ for consumption of the machine's CPU resource dimension whereas the same application may belong to Class B for consumption of the machine's memory resource dimension.

Referring back to FIG. 5, the load analysis manager 306 performs a load analysis on each application $app_i$ for resource dimension $R_d$ on Machine $M_n$ (Block 504). As shown in Block 506, the load analysis manager 306 determines if the mean value of the application $\mu^d_i$ is greater than the threshold mean value $\mu^d_T$. If so, the load analysis manager 306 determines if the standard deviation value of the application $\sigma^d_i$ is greater than the threshold standard deviation value $\sigma^d_T$ (Block 508). If so, the load analysis manager 306 removes $app_i$ from consideration (Block 510).

Returning to Block 508, if the load analysis manager 306 determines if the standard deviation value of the application $\sigma^d_i$ is not greater than the threshold standard deviation value $\sigma^d_T$, the application $app_i$ is assigned to a high mean/low deviation Class (e.g. Class $A_2$) (Block 512).

Returning to Block 506, the load analysis manager 306 determines if the standard deviation value of the application $\sigma^d_i$ is greater than the threshold standard deviation value $\sigma^d_T$ (Block 514). If so, the application $app_i$ is assigned to a low mean/high deviation Class (e.g. Class B) (Block 518). However, if not, the application $app_i$ is assigned to a low mean/low deviation Class (e.g. Class $A_1$) (Block 516).

Thereafter, the load analysis manager 306 determines if the value i is at the max value designated by the consolidation manager 210 (Block 520). If not, the value of i is incremented by 1 (Block 522), and the process returns to Block 504. However, if the value of i is at the max value, the load analysis manager 306 determines if the value d is at the max value designated by the consolidation manager 210 (Block 524). If not, the value of d is incremented by 1 (Block 526), and the process returns to Block 504. However, if the value of d is at the max value, the load analysis manager 306 determines if the value n is at the max value designated by the consolidation manager 210 (Block 528). If not, the value of n is incremented by 1 (Block 530), and the process returns to Block 504. However, if the value of n is at the max, the process ends. An example of software code which, when executed by one or more processors, performs the method in FIG. 5 is shown in Appendix A.

Figure 6:
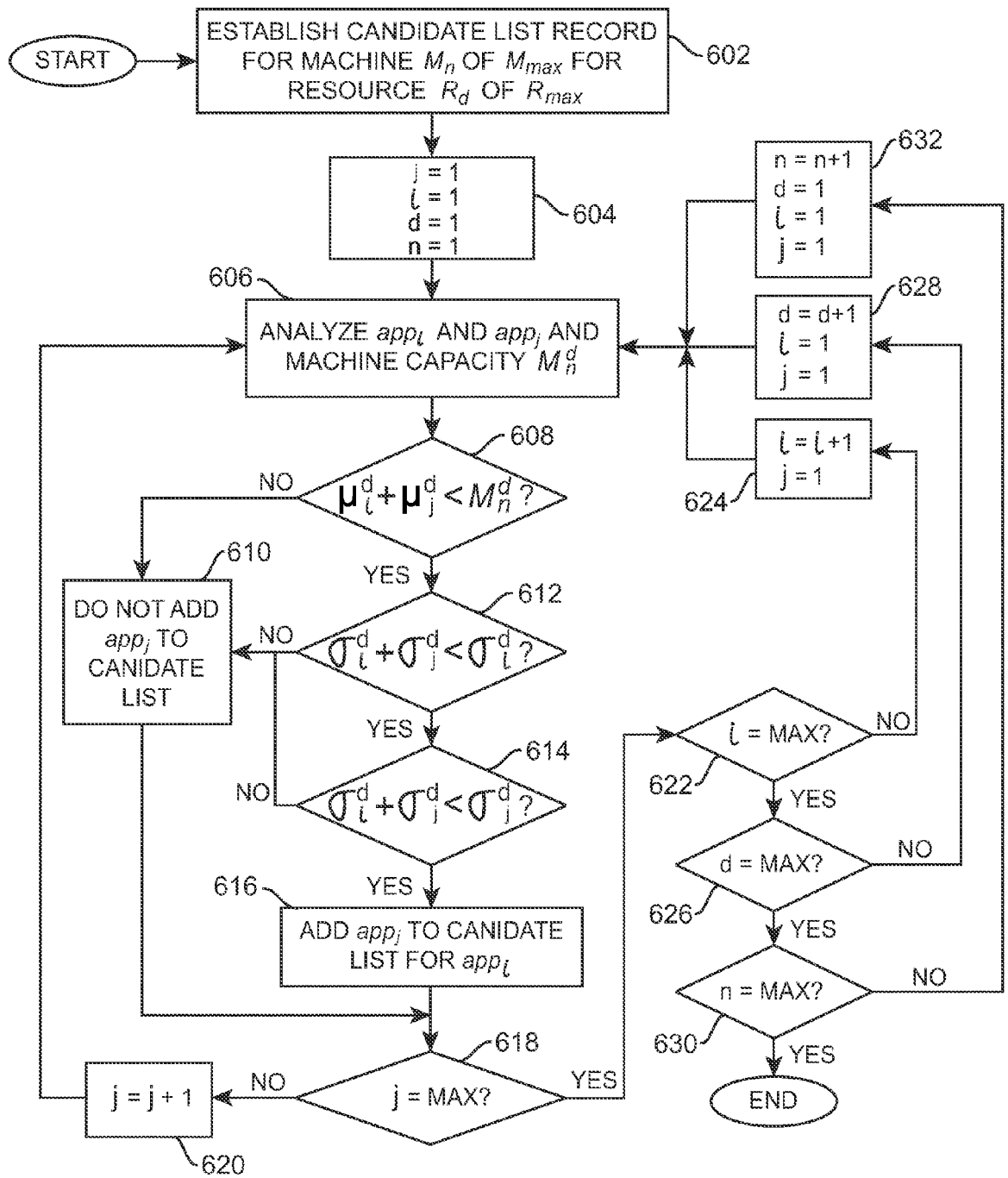

FIG. 6 illustrates a flow chart of associated with the generating candidate lists for each application in accordance with an aspect of the present disclosure. As shown in FIG. 6, the process begins at Block 602 in which a candidate list record is established for an application. In Block 604, the value i for the application $app_i$ is initialized to 1; the value j for candidate application $app_j$ is initialized to 1; the value d for the resource dimension $R_d$ is initialized to 1; and the value for n for machine $M_n$ is set to 1.

In performing the process in FIG. 6, the candidate list generator 308 chooses a reference application $app_i$ and a candidate application $app_j$ that is in the same assigned Class and analyzes the mean and standard deviation values for both (Block 606). In particular, the candidate list generator 308 determines whether the sum of the mean values for the reference application $app_i$ and a candidate application $app_j$ is less than the resource capacity of machine n for the resource dimension $R_d$ ($MC_n^d$) (Block 606). If not, the candidate application $app_j$ is not added to the candidate list for reference application $app_i$ (Block 610).

Otherwise, the candidate list generator 308 determines whether the sum of the standard deviation values for the reference application $app_i$ and a candidate application $app_j$ is greater than the standard deviation value of the reference application $app_i$ (Block 612). If so, the candidate application $app_j$ is not added to the candidate list for reference application $app_i$ (Block 610).

Otherwise, the candidate list generator 308 determines whether the sum of the standard deviation values for the reference application $app_i$ and a candidate application $app_j$ is greater than the standard deviation value of the a candidate application $app_j$ (Block 614). If so, the candidate application $app_j$ is not added to the candidate list for reference application $app_i$ (Block 610). Otherwise, the candidate application $app_j$ is added to the candidate list for reference application $app_i$ (Block 616).

Thereafter, the candidate list generator 308 determines if the value j is at the max value designated by the consolidation manager 210 (Block 618). If not, the value of j is incremented by 1 (Block 620), and the process returns to Block 606. However, if the value of j is at the max value, the candidate list generator 308 determines if the value i is at the max value designated by the consolidation manager 210 (Block 622). If not, the value of i is incremented by 1 (Block 624), and the process returns to Block 606. However, if the value of i is at the max value, the candidate list generator 308 determines if the value d is at the max value designated by the consolidation manager 210 (Block 626). If not, the value of d is incremented by 1 (Block 628), and the process returns to Block 606. However, if the value of d is at the max value, the candidate list generator 308 determines if the value n is at the max value designated by the consolidation manager 210 (Block 630). If not, the value of n is incremented by 1 (Block 632), and the process returns to Block 606. However, if the value of n is at the max, the process ends.

In accordance with an aspect of the consolidation phase, the consolidation module 210 analyzes each generated candidate list for reference candidate $app_i$ and selects only the candidate applications $app_j$ which appear in the candidate lists across all resource dimensions $R_d$. For example, for reference application $app_1$ for the CPU resource dimension $R_1$, the consolidation module 210 may determine that $app_2$, $app_3$, $app_4$, $app_5$, $app_6$ are included in reference application's $app_1$ candidate list. However, in the example, for the memory resource dimension $R_2$, the consolidation module 210 may determine that $app_2$, $app_3$, $app_7$, $app_8$, $app_9$ are included in the candidate list for reference application $app_1$. Considering that applications $app_2$, $app_3$ are common to both candidate lists for reference application $app_1$, the consolidation module 210 will select applications $app_2$, $app_3$ for consolidation with reference application $app_1$. An example of software code which, when executed by one or more processors, performs the method in FIG. 6 is shown in Appendix B.

Figure 7:
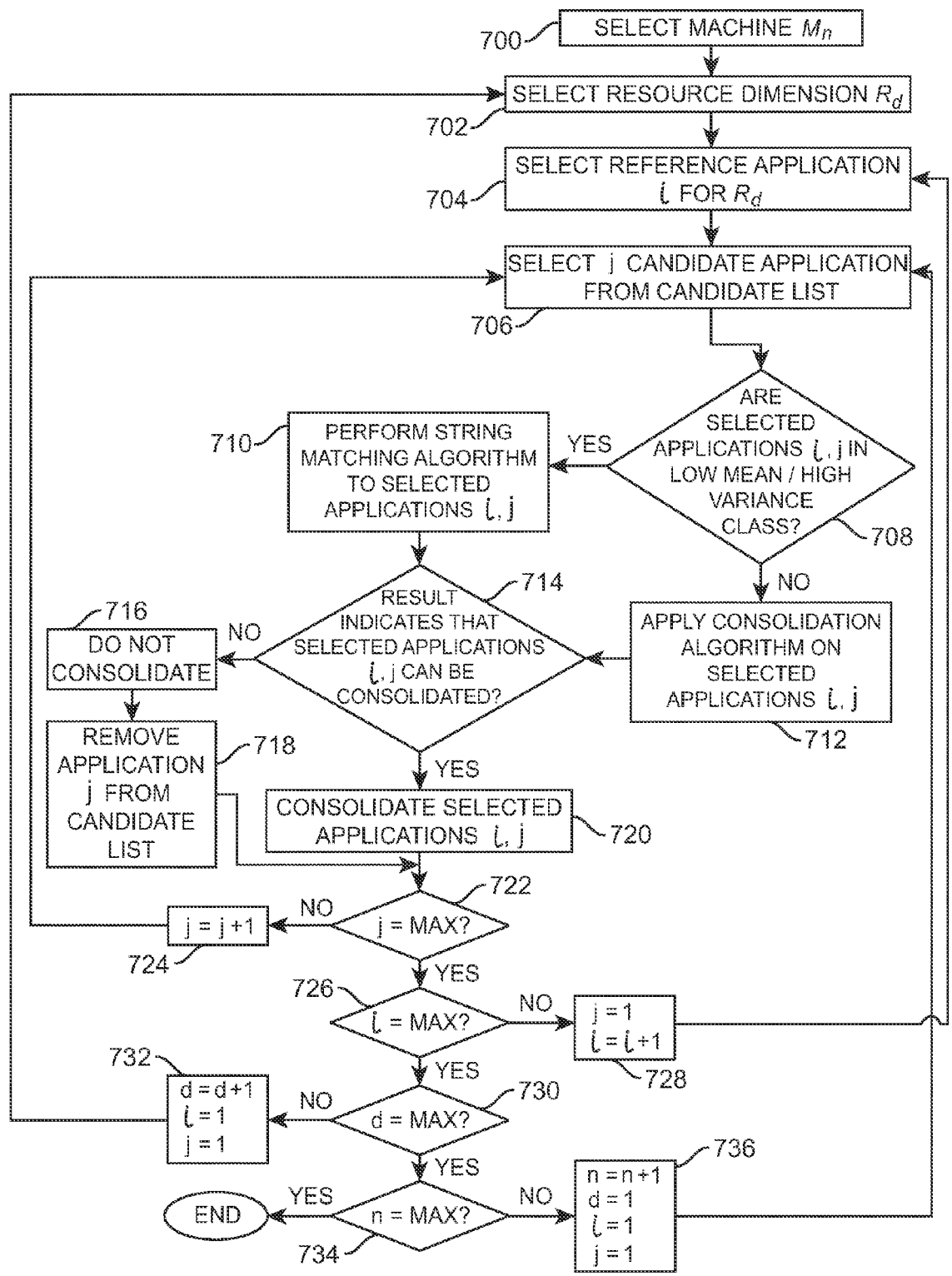

FIG. 7 illustrates a flow chart representing an at least partial process performed by the consolidation module 210 in accordance with an aspect of the present disclosure. As shown in FIG. 7, the process initiates by the allocation manager 310 of the consolidation module 210 initializes the value i for the application $app_i$ to 1; the value j for candidate application $app_j$ to 1; the value d for the resource dimension $R_d$ to 1; and the value for n for machine $M_n$ to 1 (Block 702). Thereafter, the allocation manager 310 selects reference application $app_i$ (Block 704) and candidate application $app_j$ from the generated candidate list (Block 706).

As shown in Block 708, the allocation manager 310 determines whether the selected reference application $app_i$ and the candidate application $app_j$ are assigned to a low mean/high deviation Class. If not, the allocation manager 712 applies a consolidation algorithm on the reference application $app_i$ and the candidate application $app_j$ (Block 712). In an aspect, the consolidation algorithm executed by the allocation manager 310 is a first-fit algorithm, whereby the mean values and standard deviation values of the proposed consolidated applications are analyzed and compared to each other as well as the capacity of the machine to determine if the reference application $app_i$ and the candidate application $app_j$ can be consolidated on a machine. In another aspect, the consolidation algorithm executed by the allocation manager 310 is a best-fit algorithm, whereby the mean values and standard deviation values of the proposed consolidated applications are analyzed and compared to each other as well as the capacity of the machine to determine if the reference application $app_i$ and the candidate application $app_j$ can be consolidated on a machine. The use of the first-fit and/or best-fit consolidation algorithms ensures a good packing of the applications into new servers based on their actual resource utilization profiles. An example of software code which, when executed by one or more processors, performs the first-fit algorithm is shown in Appendix C, whereas an example of software code which, when executed by one or more processors, performs the best-fit algorithm is shown in Appendix D.

Figure 8:
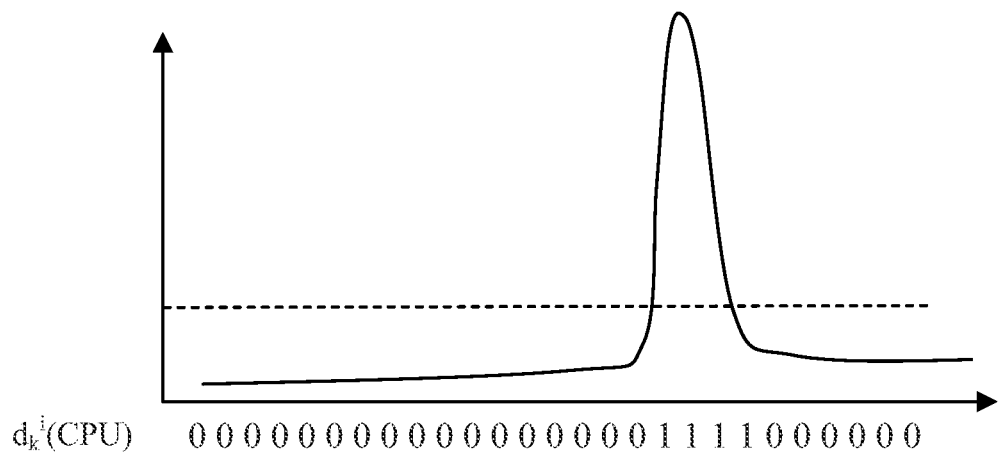
FIGS. 8-10 illustrate example graphs related to the processes described in FIGS. 4-7 in accordance with an aspect of the present disclosure.
Figure 9:
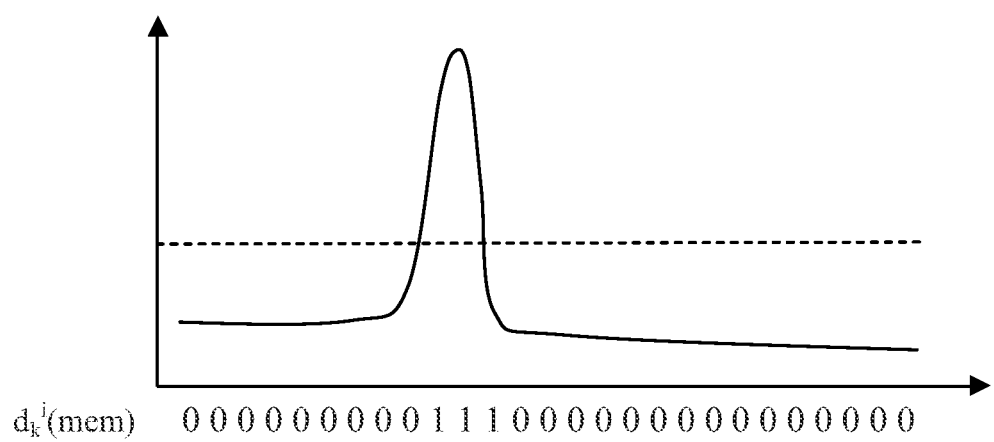

Returning to Block 708, if the allocation manager 310 determines that the selected reference application $app_i$ and the candidate application $app_j$ are not assigned to a low mean/high deviation Class, the allocation manager 310 performs a string matching algorithm on the selected applications (Block 710). In particular, the string matching algorithm uses binary string matching to prune the search candidate list for unlikely candidates. The motivation for using binary string matching as a search strategy can be appreciated from the FIGS. 8 and 9. As shown in FIGS. 8 and 9, the number of ones in the combined string should be equal to summation of the ones in the individual string. In case the number of ones in the combined string is less than the summation of the ones in the individual string then this indicates the peak utilization of a resource by one application coincides with the peak utilization of the resource by another application.

As shown in FIG. 7, the result of the computation indicates that the selected applications would not be satisfactorily consolidated on a machine (Block 716), and the allocation manager 310 removes the candidate application $app_j$ from consideration (Block 718). However, if the result of the computation indicates that the selected applications can be satisfactorily consolidated on a machine, the allocation manager 310 proposes packing the selected applications $app_i$,$app_j$ (Block 720).

Thereafter, the allocation generator 310 determines if the value j is at the max value designated by the consolidation manager 210 (Block 722). If not, the value of j is incremented by 1 (Block 724), and the process returns to Block 706. However, if the value of j is at the max value, the allocation generator 310 determines if the value i is at the max value designated by the consolidation manager 210 (Block 726). If not, the value of i is incremented by 1 (Block 728), and the process returns to Block 704. However, if the value of i is at the max value, the allocation generator 310 determines if the value d is at the max value designated by the consolidation manager 210 (Block 730). If not, the value of d is incremented by 1 (Block 732), and the process returns to Block 702. However, if the value of d is at the max value, the allocation generator 310 determines if the value n is at the max value designated by the consolidation manager 210 (Block 734). If not, the value of n is incremented by 1 (Block 736), and the process returns to Block 700. However, if the value of n is at the max, the process ends. An example of software code which, when executed by one or more processors, performs the string match algorithm is shown in Appendix E.

While embodiments and aspects have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

APPENDIX A

IdentifyResourceCategory(PMList)

1. For each PM,j, in the PMList, Do
2.    For each d in Dimension, Do
3.      if ( $\mu_j^d$ <0.5 and $\sigma_j^d$ <0.5 )
4.        $category_j^d = A_1$   [Low Mean and Low Standard Deviation]
5.      Endif
6.      if ( $\mu_j^d$ >0.5 and $\sigma_j^d$ <0.5 )
7.        $category_j^d = A_2$   [High Mean and Low Standard Deviation]
8.      Endif
9.      if ( $\mu_j^d$ <0.5 and $\sigma_j^d$ >0.5 )
10.       $category_j^d = B$   [Low Mean and High Standard Deviation]
11.     Endif
12.     if ( $\mu_j^d$ >0.5 and $\sigma_j^d$ >0.5 )
13.       Remove j from the list   [High Mean and High Standard Deviation]
14.       $flagallocated_j = 1$;
15.     Endif
16.   EndFor
17. EndFor

APPENDIX B

DetermineCandidateList(j, PMList)

1. For each PM,j" in the PMList, Do
2.   flag=1;
3.   For each d in Dimension, Do
4.     if ( $\mu_j^d + \mu_{j''}^d < C^d$ and $\sigma_{j+j''}^d < \sigma_j^d$ and $\sigma_{j+j''}^d < \sigma_{j''}^d$ and $category_j^d = category_{j''}^d$ and flag == 1)
5.       continue;
6.     else
7.       flag=0;
8.     Endif
9.   Endfor
10.   if (flag = 1)
11.     Add j" to the $CandidateList_j$
12.   Endif
13. Endfor

APPENDIX C

Algorithm First-Fit

1. For each PM,j, in the PMList, Do
2.   IdentifyResourceCategory(j)
3. EndFor

APPENDIX C-continued

Algorithm First-Fit 4.
5. For each PM,j, in the PMList, Do
6.   DetermineCandidateList(j, PMList)
7. EndFor
8.
9. Initialize $flagallocated_j$ to 0 for all j
10.
11. For each PM,j, in the PMList, Do
12.   If $flagallocated_j = 0$
13.     Initialize ListofPacked to j;
14.     For each PM,j" in $CandidateList_j$ Do
15.       Initialize flagcanbeallocated to 1
16.       For each d in Dimension, Do
17.         If ( $category_j^d = (A_1$ or $A_2)$ and $\mu_{packed}^d + \mu_{j''}^d < C^d$ and $\sigma_{packed \cup j''}^d < \sigma_{j''}^d$ and $\sigma_{packed \cup j''}^d < \sigma_{packed}^d$ and flagcanbeallocated == 1)
18.         continue;
19.         else
20.           flagcanbeallocated=0
21.           break;
22.         Endif
23.
24.         if( $category_j^d = B$ and StringMatching(ListofPacked,j",d) and flagcanbeallocated == 1)
25.           flagcanbeallocated=1
26.           continue;
27.         else
28.           flagcanbeallocated=0
29.           break;
30.         Endif
31.       Endfor
32.       if (flagcanbeallocated =1)
33.         ListofPacked= ListofPacked ∪ j"
34.         $flagallocated_j = 1$   [j is allocated now and is packed]
35.         $flagallocated_{j''} = 1$   [j" need not be considered again]
36.       else
37.         Remove j from $CandidateList_{j''}$
38.       Endif
39.     Endfor
40.   Endif
41. Endfor

APPENDIX D

Algorithm Best-Fit

1. For each PM,j, in the PMList, Do
2.   IdentifyResourceCategory(j)
3. EndFor
4.
5. For each PM,j, in the PMList, Do
6.   DetermineCandidateList(j, PMList)
7. EndFor
8. Initialize $flagallocated_j$ to 0 for all j in $CandidateList_j$
9. Initialize BestListofPacked to Empty
10. Select a j"ε $CandidateList_j$
11. For all j in PMList, do
12.   if $flagallocated_j = 0$
13.     BestFit(j,j", $CandidateList_j$) [Recursive Function]
14.     Output BestListofPacked and Remove j" from the $CandidateList_j$
15.     For all j in BestListofPacked, do
16.       $flagallocated_j = 1$;
17.     endfor
18.   endif
19. endfor
BestFit(j,j", $CandidateList_j$)
1. if j"== null or $CandidateList_j$ == Null [Stopping Criteria]
2.   return
3. endif
4.
5. Initialize ListofPacked to j
6. Initialize currentbesconsolidationmetric to 0
7. Initialize consolidationmetric to a very high value M.
8. Initialize flagcanbeallocated to 1
9. $TempCandidateList_j = CandidateList_j$

APPENDIX D-continued

Algorithm Best-Fit

```
10.  For each d in Dimension, Do
11.    If ( category_j^d =(A_1 or A_2 ) and μ_packed^d + μ_j"^d < C^d and
         σ_packed ∪j"^d < σ_j"^d and σ_packed ∪j"^d < σ_packed^d and
         flagcanbeallocated == 1)
12.      conmetric^d = calculateconsolidationmetric(ListofPacked ∪ j, d)
13.    else
14.      flagcanbeallocated = 0
15.    Endif
16.
17.    if( category_j^d =B and StringMatching(ListofPacked,j",d) and
         flagcanbeallocated == 1)
18.      conmetric^d = calculateconsolidationmetric(ListofPacked ∪ j, d)
19.    else
20.      flagcanbeallocated = 0
21.    Endif
22.
23.    if (conmetric^d < consolidationmetric) and (flagcanbeallocated == 1)
24.      consolidationmetric= conmetric^d
25.    endif
26.  Endfor
27.
28.  if (flagcanbeallocated ==1) and
     (consolidationmetric*|ListofPacked|^4 >
     currentbesconsolidationmetric )
29.    currentbesconsolidationmetric =
       consolidationmetric*|ListofPacked|^4
30.    ListofPacked= ListofPacked ∪ j"
31.    BestListofPacked=ListofPacked
32.    Remove j" from TempCandidateList_j
33.    while TempCandidateList_j is not empty
34.      Select a j'" ∈ TempCandidateList_j
35.      BestFit(ListofPacked,j'", TempCandidateList_j)
36.      Remove j'" from TempCandidateList_j
37.    endwhile
38.  else
39.    return    [pruning non-efficient solutions]
```

APPENDIX E

StringMatching(ListofPacked,j",d)

```
1.   Perform 2-means clustering analysis for ListofPacked on dimension
     d. Assume there are T data-points and the set be represented by
     N_ListofPacked.
2.   Identify the threshold, λ_packed^d , for ListofPacked
3.   B_ListofPacked = Empty
4.
5.   For all discrete points, n_τ in N_ListofPacked, do
6.     if n_τ,ListofPacked < λ_packed^d
7.       b_τ,ListofPacked =0
8.     else
9.       b_τ,ListofPacked =1
10.    Endif
11.  B_ListofPacked= B_ListofPacked ∪ b_τ,ListofPacked
12.  Endfor
13.  Perform 2-means clustering analysis for j" on dimension d. Assume
     there are T data-points and the set be represented by N.
14.  Identify the threshold, λ_j"^d , for ListofPacked
15.  For all discrete points, n_τ,j" in N_j" , do
16.    if n_τ,j" < λ_j"^d
17.      b_τ,j" =0
18.    else
19.      b_τ,j" =1
20.    Endif
21.  B_j"= B_j" ∪ b_τ,j"
22.  Endfor
23.
24.  Initialize sum^d to 0 and flagconsolidate to 0
25.  For all τ in T, do
26.    if ( b_τ,j" ==1 ) or ( b_τ,ListofPacked ==1)
27.      sum^d= sum^d +1;
28.      if ( μ_packed^d + μ_j"^d < C^d )
29.        continue;
30.      else
31.        flagconsolidate = 1
```

APPENDIX E-continued

StringMatching(ListofPacked,j",d)

```
32.        break;
33.      endif
34.    endif
35.  endfor
36.  if (sum^d ==0) or (flagconsolidate==0)
37.    return True
38.  else
39.    return false
```

What is claimed is:

1. A method of selectively consolidating applications on a machine, the method comprising:

retrieving, from a database, resource utilization data for a plurality of applications running on one or more machines, wherein the resource utilization data gathered from the database is over a plurality of cycles in relation to one or more designated resource dimensions;

calculating, using a processor on a network device, a representative utilization profile for a first application for each of the one or more designated resource dimensions using a curve representation technique;

calculating, using the processor, a first load mean value and a first load variance value of the first application for each of the one or more resource dimensions and assigning the first application to a first class category based the first load mean value and the first load variance value;

selecting a second application assigned to the first class category to consolidate with the first application, wherein the second application has a first load mean value and a first load variance value based on a calculated representative utilization profile for the second application;

computing, using the processor, a consolidation algorithm on the first and second applications for a respective resource dimension of the one or more designated resource dimensions, wherein the processor, executing the consolidation algorithm, at least partially analyzes the first and second load mean values and the first and second variance values and to determine if resource consumption of the consolidated first and second applications would potentially exceed an available capacity in the one or more designated resource dimensions of a selected machine;

generating a candidate list record of one or more proposed applications to consolidate with the first application, wherein the second application is in the candidate list record;

selecting a third application in the same category with the first and second applications;

combining load mean values of the first and third applications;

combining load variance values of the first and third applications; and adding the third application to the candidate list record if the combination of the load mean values is less than a capacity of the machine and the combination of load variance values of the first and third applications is less than the load variance value of the first application and the combination of load variance values of the first and third applications is less than the load variance value of the third application.

2. The method of claim 1, wherein the consolidation algorithm is a first fit algorithm.

3. The method of claim 1, wherein the consolidation algorithm is a best fit algorithm.

4. The method of claim 1, wherein the consolidation algorithm is a string matching algorithm.

5. The method of claim 1, further comprising:
iteratively computing the consolidation algorithm on the first and second applications for all remaining one or more designated resource dimensions, wherein the consolidation algorithm at least partially analyzes the first and second load mean values and the first and second variance values and to determine if resource consumption of the consolidated first and second applications would potentially exceed the available capacity in the remaining one or more designated resource dimensions of the selected machine; and
proposing consolidation of the first and second applications if the consolidation algorithm indicates that the resource consumption of the consolidated first and second applications would not exceed available capacities of the remaining one or more designated resource dimensions of the selected machine.

6. The method of claim 1 further comprising collecting the resource utilization data for the first, second and third applications over a user designated number of cycles.

7. A non-transitory processor readable medium having stored thereon instructions for selectively consolidating applications on a network device, comprising processor executable code which when executed by a processor of the network device, causes the processor to:
retrieve, from a database, resource utilization data for a plurality of applications running on one or more machines, wherein the resource utilization data gathered from the database is over a plurality of cycles in relation to one or more designated resource dimensions;
calculate a representative utilization profile for a first application for each of the one or more designated resource dimensions using a curve representation technique;
calculate a first load mean value and a first load variance value of the first application for each of the one or more resource dimensions and assign the first application to a first class category based the first load mean value and the first load variance value;
select a second application assigned to the first class category to consolidate with the first application, wherein the second application has a first load mean value and a first load variance value based on a calculated representative utilization profile for the second application;
compute a consolidation algorithm on the first and second applications for a respective resource dimension of the one or more designated resource dimensions, wherein the computer, executing the consolidation algorithm, at least partially analyzes the first and second load mean values and the first and second variance values and to determine if resource consumption of the consolidated first and second applications would potentially exceed an available capacity in the one or more designated resource dimensions of a selected machine;
generate a candidate list record of one or more proposed applications to consolidate with the first application, wherein the second application is in the candidate list record;
select a third application in the same category with the first and second applications;
combine load mean values of the first and third applications;
combine load variance values of the first and third applications; and
adding the third application to the candidate list record if the combination of the load mean values is less than a capacity of the machine and the combination of load variance values of the first and third applications is less than the load variance value of the first application and the combination of load variance values of the first and third applications is less than the load variance values of the third application.

8. The computer readable medium of claim 7, wherein the consolidation algorithm is a first fit algorithm.

9. The computer readable medium of claim 7, wherein the consolidation algorithm is a best fit algorithm.

10. The computer readable medium of claim 7, wherein the consolidation algorithm is a string matching algorithm.

11. The computer readable medium of claim 7, wherein the processor executable code which when executed by the processor, causes the processor to:
iteratively compute the consolidation algorithm on the first and second applications for all remaining one or more designated resource dimensions, wherein the consolidation algorithm at least partially analyzes the first and second load mean values and the first and second variance values and to determine if resource consumption of the consolidated first and second applications would potentially exceed the available capacity in the remaining one or more designated resource dimensions of the selected machine;
propose consolidation of the first and second applications if the consolidation algorithm indicates that the resource consumption of the consolidated first and second applications would not exceed available capacities of the remaining one or more designated resource dimensions of the selected machine.

12. The processor readable medium of claim 7, wherein the processor executable code which when executed by the processor, causes the processor to collect the resource utilization data for the first, second and third applications over a user designated number of cycles.

13. A network device comprising:
a network interface configured to allow communications with at least one database;
a memory;
a processor coupled to the network interface and the memory, the processor operative to:
retrieve, from the at least one database, resource utilization data for a plurality of applications running on one or more machines, wherein the resource utilization data gathered from the database is over a plurality of cycles in relation to one or more designated resource dimensions;
calculate a representative utilization profile for a first application for each of the one or more designated resource dimensions using a curve representation technique;
calculate a first load mean value and a first load variance value of the first application for each of the one or more resource dimensions and assign the first application to a first class category based the first load mean value and the first load variance value;
select a second application assigned to the first class category to consolidate with the first application, wherein the second application has a first load mean value and a first load variance value based on a calculated representative utilization profile for the second application;
compute a consolidation algorithm on the first and second applications for a respective resource dimension of the one or more designated resource dimensions, wherein the processor, executing the consolidation algorithm, at least partially analyzes the first and second load mean values and the first and second variance values and to determine if resource consumption of the consolidated first and second applications would potentially exceed an available capacity in the one or more designated resource dimensions of a selected machine;

generate a candidate list record of one or more proposed applications to consolidate with the first application, wherein the second application is in the candidate list record;

select a third application in the same category with the first and second applications;

combine load mean values of the first and third applications;

combine load variance values of the first and third applications; and adding the third application to the candidate list record if the combination of the load mean values is less than a capacity of the machine and the combination of the load variance values of the first and third applications is less than the load variance value of the first application and the combination of load variance values of the first and third applications is less than the load variance value of the third application.

14. The network device of claim 13, wherein the consolidation algorithm is a first fit algorithm.

15. The network device of claim 13, wherein the consolidation algorithm is a best fit algorithm.

16. The network device of claim 13, wherein the consolidation algorithm is a string matching algorithm.

17. The network device of claim 13, wherein the processor is configured to:

iteratively compute the consolidation algorithm on the first and second applications for all remaining one or more designated resource dimensions, wherein the consolidation algorithm at least partially analyzes the first and second load mean values and the first and second variance values and to determine if resource consumption of the consolidated first and second applications would potentially exceed the available capacity in the remaining one or more designated resource dimensions of the selected machine; and propose consolidation of the first and second applications if the consolidation algorithm indicates that the resource consumption of the consolidated first and second applications would not exceed available capacities of the remaining one or more designated resource dimensions of the selected machine.

18. The network device of claim 13, wherein the processor is configured to collect the resource utilization data for the first, second and third applications over a user designated number of cycles.

* * * * *